(12) United States Patent
Takahashi et al.

(10) Patent No.: US 7,031,895 B1
(45) Date of Patent: Apr. 18, 2006

(54) APPARATUS AND METHOD OF GENERATING NETWORK SIMULATION MODEL, AND STORAGE MEDIUM STORING PROGRAM FOR REALIZING THE METHOD

(75) Inventors: Eiichi Takahashi, Kanagawa (JP); Ken Yokoyama, Kanagawa (JP); Naohiro Tamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/572,937

(22) Filed: May 18, 2000

(30) Foreign Application Priority Data

Jul. 26, 1999 (JP) .................................. 11-211324

(51) Int. Cl.
G06F 17/50 (2006.01)
G06F 7/62 (2006.01)
G06F 15/173 (2006.01)

(52) U.S. Cl. ....................................... 703/13; 709/223

(58) Field of Classification Search ................. 703/13; 709/223
See application file for complete search history.

(56) References Cited

U.S. PATENT DOCUMENTS

| 5,754,831 | A | * | 5/1998 | Berman ........................ 703/13 |
| 5,815,491 | A | * | 9/1998 | Guibert ....................... 370/233 |
| 5,845,124 | A | * | 12/1998 | Berman ........................ 703/2 |
| 5,970,064 | A | * | 10/1999 | Clark et al. ................. 370/351 |
| 6,094,682 | A | * | 7/2000 | Nagasawa ................... 709/224 |

FOREIGN PATENT DOCUMENTS

JP 9-62601 3/1997

* cited by examiner

*Primary Examiner*—Paul L. Rodriguez
*Assistant Examiner*—Dwin M. Craig
(74) *Attorney, Agent, or Firm*—Staas & Halsey LLP

(57) ABSTRACT

Upon receipt of an end point list, a model setting unit requests the measurement/information collection unit to search a path. The model setting unit receives a path appliance list from the measurement/information collection unit, and generates the configuration of a simulation model of a network. The model setting unit selects an appropriate model for each component of the configuration of the simulation model. Then, the model setting unit sets the parameter value of the model based on the measurement result and the collected information received from the measurement/information collection unit, and automatically generates the simulation model of the network.

38 Claims, 9 Drawing Sheets

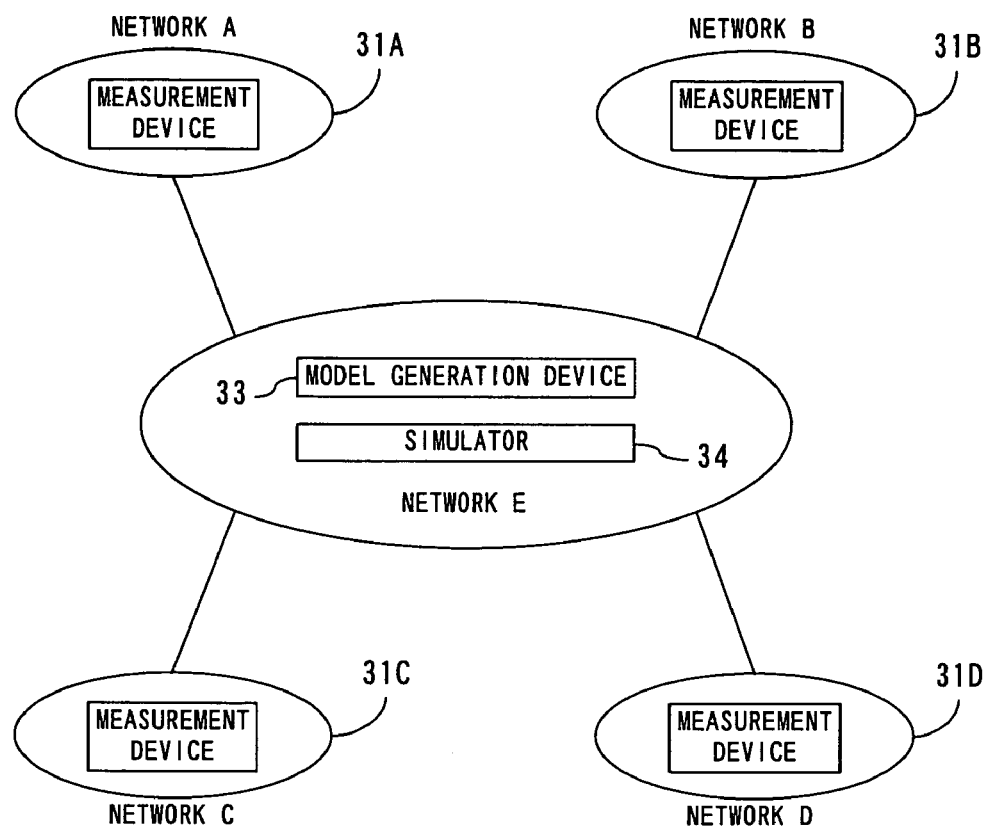
F I G. 7

APPARATUS AND METHOD OF GENERATING NETWORK SIMULATION MODEL, AND STORAGE MEDIUM STORING PROGRAM FOR REALIZING THE METHOD

BACKGROUND OF THE INVENTION

1. Field of the Invention

The present invention relates to a network simulation technology, and more specifically to a network simulation model generation apparatus, method, and a storage medium storing the program for realizing the method.

2. Description of the Related Art

Recently, the scale of networks such as Internet has been quickly extended. In addition, the types of networks have been shifted from voice communications such as telephone, etc. to data communications and multimedia communications. Especially, it is predicted that the multimedia communications capable of transmitting a large volume of data at a high speed will lead this field in the future, and that there will be much heavier traffic in the networks. Furthermore, with network appliances of higher performance, the configuration of a network will be more complicated, and a frame relay network, an ATM (asynchronous transfer mode) network are connected to a router, which is an important network appliance forming part of Internet, thereby increasing the structure of a VPN (virtual private network), an IP over ATM, an IP over SONET, an IP over WTM, etc. in the future.

In the above described high-level network field, it is assumed that a simulator has a more and more important function in realizing the optimization of the structure of network resources and arrangements, evaluating the influence of heavier traffic on the networks, etc.

Such a network simulator predicts various information such as the traffic in a network, etc. based on a simulation model of a network. Conventionally, the above described simulation model has been generated and managed by the system described below.

a) System Manually Set by a User

In this system, a user manually generates a simulation model using the tool for generating a simulation model.

b) System Using a Database

In this system, marketed simulation models (simply referred to as models) of network appliances of vendors are put in a database. Then, the user selects a model of a network appliance from the database, and generates a simulation model of the network.

c) Network Management Tool Cooperative System

In this system, the configuration of a network, the traffic of a network, etc. are collected using the network management tool such as a marketed network diagnosis tool, etc. According to the collection information, a simulation model of the network can be generated.

However, there has been the following problem with the above described conventional system.

a) System Manually Set by a User

In this system, since the user has to check in detail the network whose simulation model is to be generated, and to collect the information required to generate the model, the user has a heavy operation load. Furthermore, to collect the above described information, it is necessary for a user to be familiar to the network search technology and the simulation technology. Therefore, a user who is generating a simulation model has to be well-trained in these technologies. As a result, only an expert having a good knowledge of the technologies can generate a simulation model.

b) System Using a Database

There is the problem with this system that a simulation model may not be generated when the database does not contain a model of a network appliance required for the simulation model to be generated. In addition, each time a new network appliance is brought to the market, it is necessary to add a model of the network appliance to the database, and update the database. Therefore, maintaining the database has a heavy operation load, and the management is costly.

c) Network Management Tool Cooperative System

Since collectable information is limited in this system, a simulation model may not be correctly generated with the present situation of the network well reflected. That is, since the information collected by the network management tool is the information about the usage state of the network such as a traffic flow, the information indispensable in generating a simulation model of a network such as the information (transmission speed, capacity, etc.) about the performance of a network appliance may not be obtained.

Furthermore, in any of the systems a), b), and c), there have been the following problems with the generation and the management of a simulation model.

1) Costly Computing Process for Excess Use of a Detailed Model, and Limit to an Applicable Network Normally, in a simulation, the detail level of a model is adjusted depending on the influence on a result. Conventionally, an adjustment is manually made by the user, or a detailed model is used without adjustment. However, if a detailed model is used without adjustment, the most detailed model is applied to all models, the entire simulation cost soars high because the more detailed a model is, the higher the computation cost becomes.

In addition, the increased computation cost of the simulation reduces the scale of a network to be simulated when the entire cost is limited.

2) Difficult Simulation Between Networks Due to Management Problems

Generally, a large scale network is divided into a plurality of lower networks (subnetworks), and each lower network is managed by a different manager. A conventional simulator is individually operated by each manager of each of the lower networks. A simulation model of each lower network is also managed by the management system.

However, when a simulation model spanning plural lower networks is generated, it is necessary to collect the management information about another lower network. Nevertheless, it is very hard to successfully generate such a simulation model because there occur individual problems with the operation of each lower network (security, optional configuration amendments, etc.).

SUMMARY OF THE INVENTION

The present invention aims at generating a simulation model of a network without a database of a model of an appliance. In addition, the present invention aims at generating a simulation model of a network without limit to the information held in the cooperative network management tools. Furthermore, the present invention aims at generating a network simulation model capable of reducing the computation cost by automatically adjusting the detail level of an appliance model. Additionally, the present invention aims at realizing an easier process of generating a simulation model for use spanning a plurality of networks.

The simulation model generation apparatus according to the first aspect of the present invention includes the following units.

A model configuration determination unit determines the configuration of the simulation model of a network by inputting the information about at least two end points in a network, and inputting the information about the appliance in the path in the network connecting the end points.

A model setting unit generates a simulation model of the above described network by selecting an appropriate model for each component of the simulation model determined by the model configuration determination unit, and inputting necessary data for setting a parameter value of each model.

Upon receipt of a request from the model configuration determination unit, a path detection unit detects an appliance in the path of the network connecting the end points, and returns the appliance information to the model configuration determination unit.

Upon receipt of a request from the model setting unit, a measurement/information collection unit obtains the information for acquisition of the requested data from the network, obtains the requested data according to the obtained information, and returns it to the model setting unit.

Thus, with the simulation model generation apparatus according to the first aspect of the present invention, the measurement/information collection unit obtains the data necessary for setting a parameter value of the model of each component of a simulation model. Then, the model setting unit sets a parameter value of the model of each component from the data obtained by the measurement/information collection unit, and generates a network simulation model. Therefore, a simulation model can be automatically generated without limits to the network appliance database or the network management tool. An automatically generated network simulation model is based on actual measurement, thereby correctly reflecting the current situation of the network.

Like the simulation model generation apparatus of the network according to the first aspect of the present invention, the simulation model generation apparatus according to the second aspect of the present invention includes the model configuration determination unit, the model setting unit, the path detection unit, and the measurement/information collection unit. The model setting unit is a single simple unit for each connection point about the component of the network outside the path connecting the end points. In this case, for example, the model setting unit generates the single simple model as a model simulating the input/output traffic for the connection points of the path.

Thus, with the simulation model generation apparatus of the network according to the second aspect of the present invention, the simulation computation cost can be reduced without lowering the simulation precision by processing a network portion not requiring a high detail level when a simulation model is generated.

With the simulation model generation apparatus according to the third aspect of the present invention, the measurement/information collection unit of the simulation model generation apparatus according to the first aspect of the present invention is distributed inside and outside the network, or is mounted in the node (server, router, etc.) in the network.

Thus, with the simulation model generation apparatus according to the third aspect of the present invention, the measurement/information collection unit is provided near a measurement target, that is, at a position convenient in the measuring process. Therefore, the data measurement precision can be improved, and the number of types of data to be measured can be increased, thereby more correctly setting the parameter value of the model of each component of a simulation model, and generating a precise simulation model.

The simulation model generation apparatus according to the fourth aspect of the present invention divides the network into a plurality of subnetworks (lower networks). Then, a model generation apparatus including the model configuration determination unit, the model setting unit, the path detection unit, and the measurement/information collection unit for generation of a simulation model of the current network is mounted in each of the subnetworks. Furthermore, a model management unit for managing a simulation model of each subnetwork provided from the model generation apparatus arranged in each subnetwork is mounted. The model generation apparatus provides a simulation model of the current network for the model management unit, for example, at an instruction, periodically, by changing the configuration of the current network, etc.

The simulation model of each subnetwork managed by the model management unit can be, for example, referred to by a simulator provided in each subnetwork. In addition, for example, the manager of each of the subnetworks adjusts the detail level of a simulation model of the current network provided for the model management apparatus. In addition, the model management unit adjusts and controls the detail level of the simulation model of another subnetwork capable of referring to the simulator of each subnetwork, for example, depending of the detail level of the simulation model provided by the model generation apparatus of each subnetwork.

Thus, with the simulation model generation apparatus according to the third aspect of the present invention, a network is divided into a plurality of subnetworks, and the model generation apparatus is provided for each subnetwork. Then, the model generation apparatus of each of the subnetworks generates a simulation model of the current network. The model management unit manages the simulation model generated by the model generation apparatus of each subnetwork.

With the above described configuration, the simulator of each subnetwork can refer to the simulation model of another subnetwork through the model management unit. Therefore, the simulator of each subnetwork can perform the simulation over the entire network and over a plurality of subnetworks. In addition, the detail level of the simulation model of each subnetwork provided for the model management unit can be determined with the management conditions of each subnetwork taken into account.

The method of generating a simulation model of a network according to the first aspect of the present invention has the following features. That is, (a) the information about at least two end points in a network is input, (b) an appliance in the path in the network connecting the end points are detected, and the appliance information is obtained, (c) the configuration of the simulation model of the network is determined according to the appliance information, (d) an appropriate model is selected for each component of the determined simulation model, and (e) the necessary data for setting a parameter value of the selected model is obtained from the network, and the simulation model of the network is generated.

The method of generating a simulation model of a network according to the second aspect of the present invention has the following feature. That is, in the step (d) above, the component of the network outside the path connecting the end points is a single simple model for each connection point.

The method of generating a simulation model of a network according to the third aspect of the present invention has the following features in addition to the steps (a) through (e) above. That is, (f) for a model whose parameter value has been determined, the data relating to the model is actually measured in the network, an operation equivalent to the actual measurement is simulated in the simulation model, and, based on the comparison result between the actual measurement value and the simulation result, the parameter value of the model is changed if necessary.

The method of generating a simulation model of a network according to the fourth aspect of the present invention has the following feature. That is, the process of obtaining data in the step (e) above is performed in the portion distributed inside or outside the network, or in the node provided in the network.

The method of generating a simulation model of a network according to the fifth aspect of the present invention has the following features. That is:
(a) The network is divided into a plurality of subnetworks. For each of the subnetworks;
(b1) The information about at least two end points in the network is input;
(b2) The appliance in the path in the network connecting the end points is detected, and the relevant appliance information is obtained;
(b3) The configuration of the simulation model of the network is determined according to the appliance information;
(b4) An appropriate model is selected for each component of the determined simulation model;
(b5) Necessary data for setting the parameter value of the selected model is obtained, and a simulation model of the network is generated; and
(c) A simulation model of each subnetwork is generated in each subnetwork, and is then managed.

BRIEF DESCRIPTION OF THE DRAWINGS

FIG. 7 shows the system configuration according to the second embodiment of the present invention.

DESCRIPTION OF THE PREFERRED EMBODIMENTS

The embodiments of the present invention are described below by referring to the attached drawings.

Figure 1:
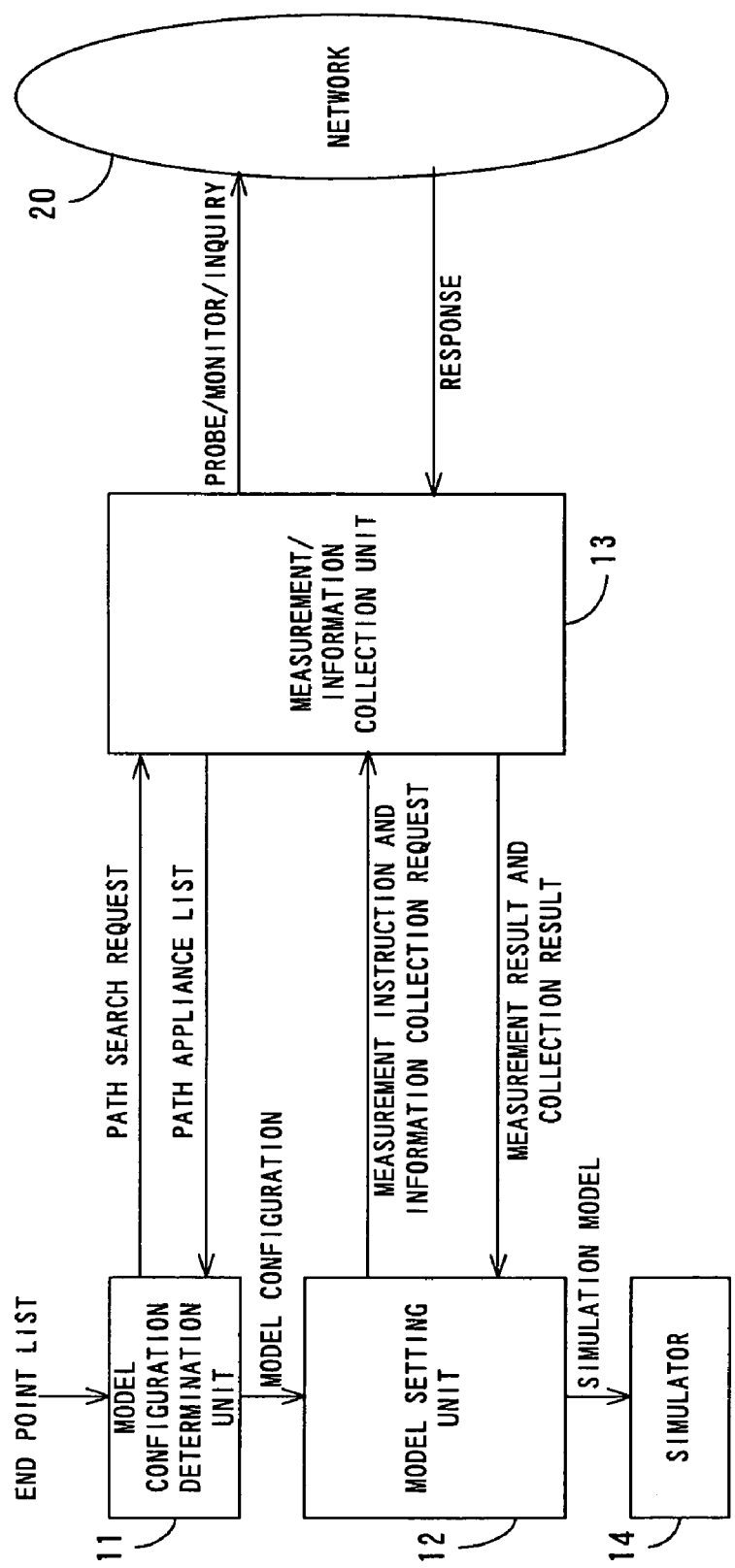
FIG. 1 shows the principle of the present invention.

FIG. 1 shows the principle of the simulation model generation apparatus of the network according to the present invention.

In FIG. 1, a network 20 is a network for which a simulation model is to be generated.

A model configuration determination unit 11 receives an end point list, refers to the end point list, and requests a measurement/information collection unit 13 to search a path. Then, it generates the configuration information about a simulation model of the network 20 based on the path appliance list received from the measurement/information collection unit 13.

An end point refers to an end node in a network for receiving a service from, and providing a service to another end node. An end point list refers to information representing in a list form the connection information about an end node in a network. The information can also be represented in a data structure other than a list. The path appliance list refers to information representing in a list form the connection information about a relay node (network appliance) in the communications path between end points in the network 20. The information can also be represented in a data structure other than a list.

A model setting unit 12 receives the simulation model configuration information, selects an appropriate model for the component of the network 20 at each end point, sets a parameter (parameter value) of the model, and generates a simulation model of the network 20. The model setting unit 12 generates the simulation model based on the measurement result obtained from the measurement/information collection unit 13, and transmits the model to a simulator 14.

Upon receipt of a request for a path search from the model configuration determination unit 11, the measurement/information collection unit 13 obtains the path appliance list through a probe, a monitor, an inquiry, etc., and returns it to the model configuration determination unit 11. In addition, the measurement/information collection unit 13 receives a request (measurement instruction request) from the model setting unit 12, obtains from the network 20 through a probe, a monitor, an inquiry, etc. the necessary data (various measurement data, appliance detection information, appliance information, etc.) for the model setting unit 12 to set a parameter, and returns the obtained information to the model setting unit 12 as a measurement result.

The simulator 14 simulates a simulation model received from the model setting unit 12. The simulator 14 can be an existing simulator.

Thus, in the simulation model generation apparatus in the network shown in FIG. 1, the necessary information for generating a simulation model is automatically obtained from the network 20 to be simulated, and a simulation model is generated for the network 20. Therefore, unlike the conventional apparatus, the simulation model generation apparatus according to the present invention does not require a database storing a simulation model of an appliance, or is not subject to the limit by a cooperative network management tool, thereby automatically generating a simulation model of the network 20. In addition, since a simulation model is generated according to the actual measurement value and information collected from the network 20, a simulation model correctly reflecting the current configuration of the network 20 can be generated.

Figure 2:
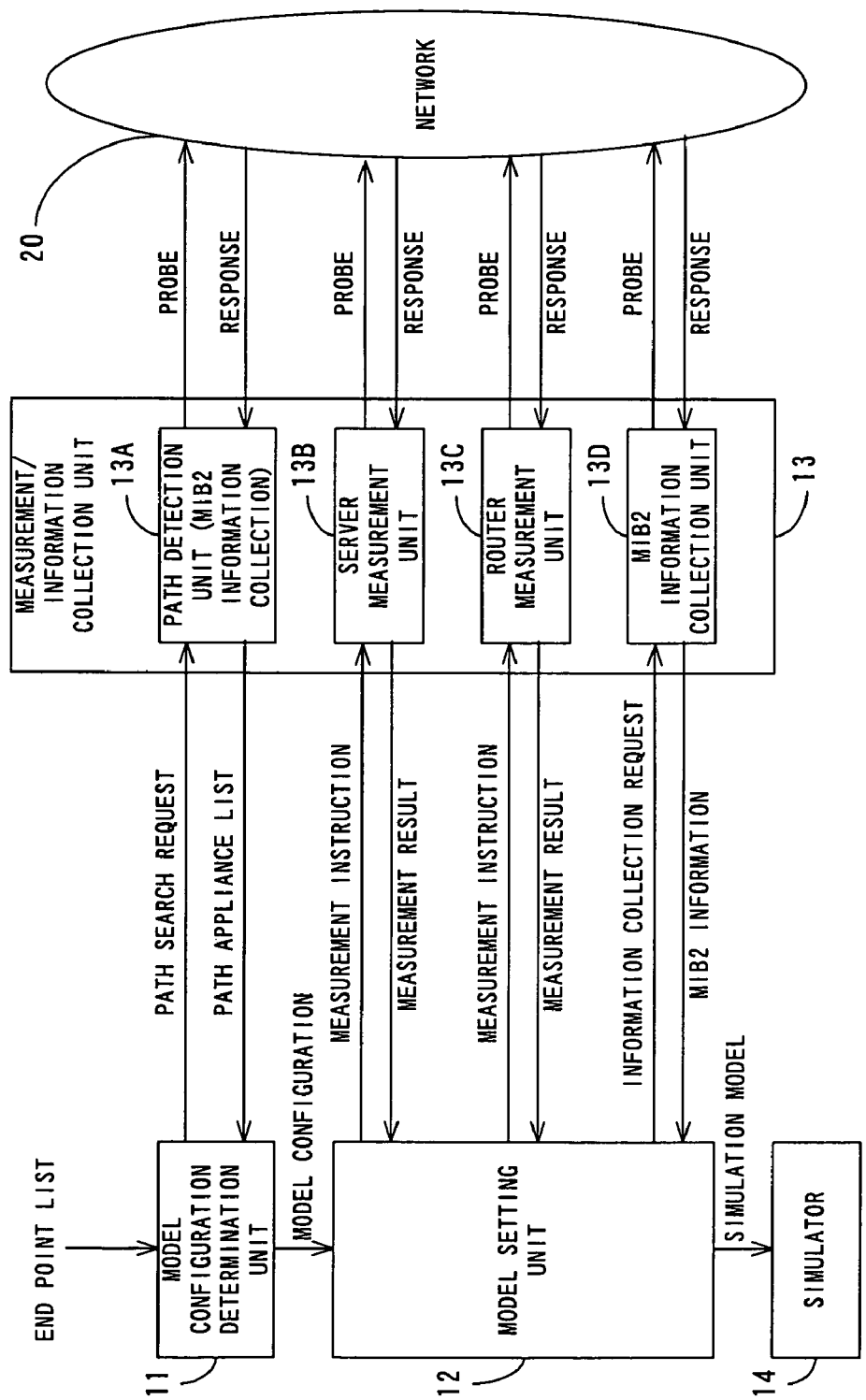
FIG. 2 is a block diagram of the system configuration of the first embodiment of the present invention.

FIG. 2 is a block diagram showing the system configuration of the simulation model generation apparatus of the network according to the first embodiment of the present invention. In FIG. 2, the components also shown in FIG. 1 are assigned the same unit numbers.

As shown in FIG. 2, the measurement/information collection unit 13 comprises a path detection unit 13A, a server measurement unit 13B, a router measurement unit 13C, and an MIB2 information collection unit 13D. The function of each of these units is described later. The path detection unit 13A, the server measurement unit 13B, the router measurement unit 13C, and the MIB2 information collection unit 13D can be mounted in separate apparatuses.

Figure 3:
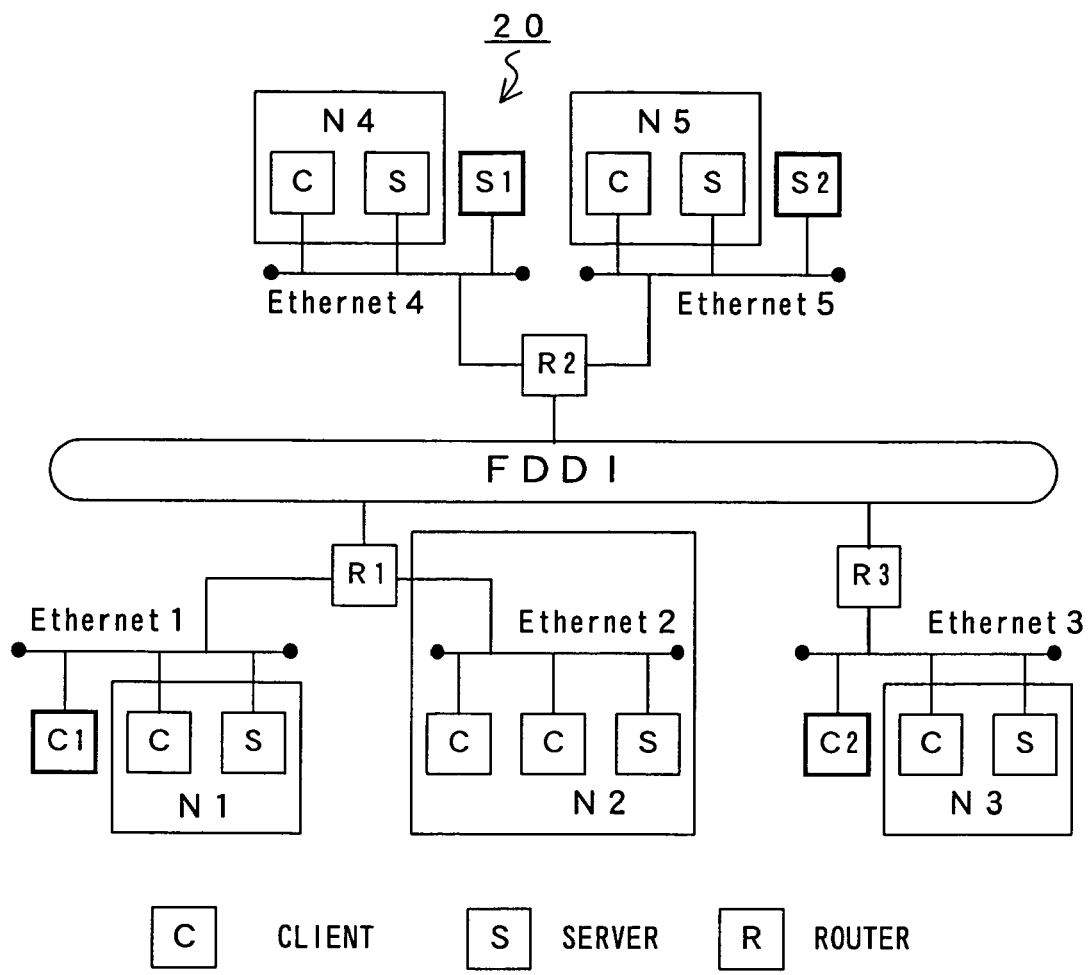
FIG. 3 is an example of the configuration of the network for which a simulation model is to be generated according to the first embodiment of the present invention.

FIG. 3 shows an example of the configuration of the network 20. In FIG. 20, C, C1, and C2 are clients. S, S1, and S2 are servers. R1, R2, and R3 are routers. In FIG. 3, the clients and server connected to respective Ethernets are assigned the same symbols C and S for convenience.

As shown in FIG. 3, the network 20 is a network having the FDDI (fiber distributed data interface) 21 as the backbone. The routers R1 and R2 are connected to the FDDI, and five Ethernets (Ethernet 1 through Ethernet 5) are connected to the FDDI through the router R2.

Two clients C1 and C, and one server S are connected to the Ethernet 1. Two clients C, and one server S are connected to the Ethernet 2. Two clients C2 and C, and one server S are connected to the Ethernet 3. One clients C, and two servers S and S1 are connected to the Ethernet 4. One client C, and two servers S and S2 are connected to the Ethernet 5.

In addition, the Ethernets 1 and 2 are connected to the FDDI through the router R1. The Ethernets 4 and 5 are connected to the FDDI through the router R2. The Ethernet 3 is connected to the FDDI through the router R3.

Described below are the network 20 shown in FIG. 3 as an example of the network to be simulated, and the configuration and the operation of the simulation model generation apparatus shown in FIG. 2.

The response time of the services of the servers S1 and S2 for the clients C1 and C2, and the load of the network 20 are evaluated by a simulation.

First, the model configuration determination unit 11 inputs an end point list about the clients C1 and C2 and the servers S1 and S2. The end point list is, for example, an address list of the clients C1 and C2, and the servers S1 and S2. One end point refers to the clients C1 and C2, and the other end point refers to the servers S1 and S2.

In addition, the addresses of the clients C1 and C2 and the servers S1 and S2 can be anything such as a machine name that can specify the node (computer, etc.) in the network 20, or can specify a client and a server in segment units. That is, for example, it can be an IP address, etc.

Upon receipt of an end point list, the model configuration determination unit 11 requests the path detection unit 13A in the measurement/information collection unit 13 to search a path connecting the clients C1 and C2 and the servers S1 and S2 in the network 20.

The path detection unit 13A detects an appliance in the communications path in the network 20 for interfacing the clients C1 and C2 and the servers S1 and S2. The information about the detected appliance is returned to the model configuration determination unit 11 as a path appliance list.

The path appliance list can refer to the addresses of routers and the types of links for each of the detected path. A link refers to a line connecting nodes in a network. For example, it corresponds to the installation of a physical layer of an OSI (open systems interconnection) model. A link can be classified into a WAN (wide area network) specification, a LAN (local area network) specification, etc. That is, in the case of the network 20 shown in FIG. 3, the LANs of the FDDI, the Ethernets 1 through 5, etc. correspond to the links.

The path detection unit 13A detects a path using, for example, a 'traceroute' known as a command in the UNIX. The 'traceroute' is a standard equipment for the Windows NT, the Windows 98', etc. ("Windows NT" and "Windows 98" are operating systems which are registered trade mark of Microsoft Corp., U.S.A.) Using the 'traceroute', it can be checked as to what router a packet passes through between the source and the destination when communications are established through Internet.

In addition, the path detection unit 13A obtains the type of link from the SNMP (simple network management protocol), the SNMPv2 (SNMP version 2), etc. prescribed by the RFC (request for comments) of the IETF (Internet engineering task force).

The path detection unit 13A can ask the model setting unit 12 the necessity of the acquisition of the type information of a link. In this case, the path detection unit 13A does not detect the type of link if the model setting unit 12 can select a model regardless of the type of link.

In the case of the network 20 shown in FIG. 3, the path detection unit 13A detects and searches four paths of the C1-S1 (path 1-1), the C1-S2 (path 1-2), the C2-S1 (path 2-1), and the C2-S1 (path 2-2), and obtains the search results (path appliance lists) as follows.

path 1-1: C1-Ethernet 1-R1-FDDI-R2-Ethernet 4-S1
path 1-2: C1-Ethernet 1-R1-FDDI-R2-Ethernet 5-S2
path 2-1: C2-Ethernet 3-R3-FDDI-R2-Ethernet 4-S1
path 2-2: C2-Ethernet 3-R3-FDDI-R2-Ethernet 5-S2

Upon receipt of the path appliance lists of the four paths from the path detection unit 13A, the model configuration determination unit 11 determines the configuration of the simulation model from the lists, and transmits the configuration information to the model setting unit 12.

Figure 4:
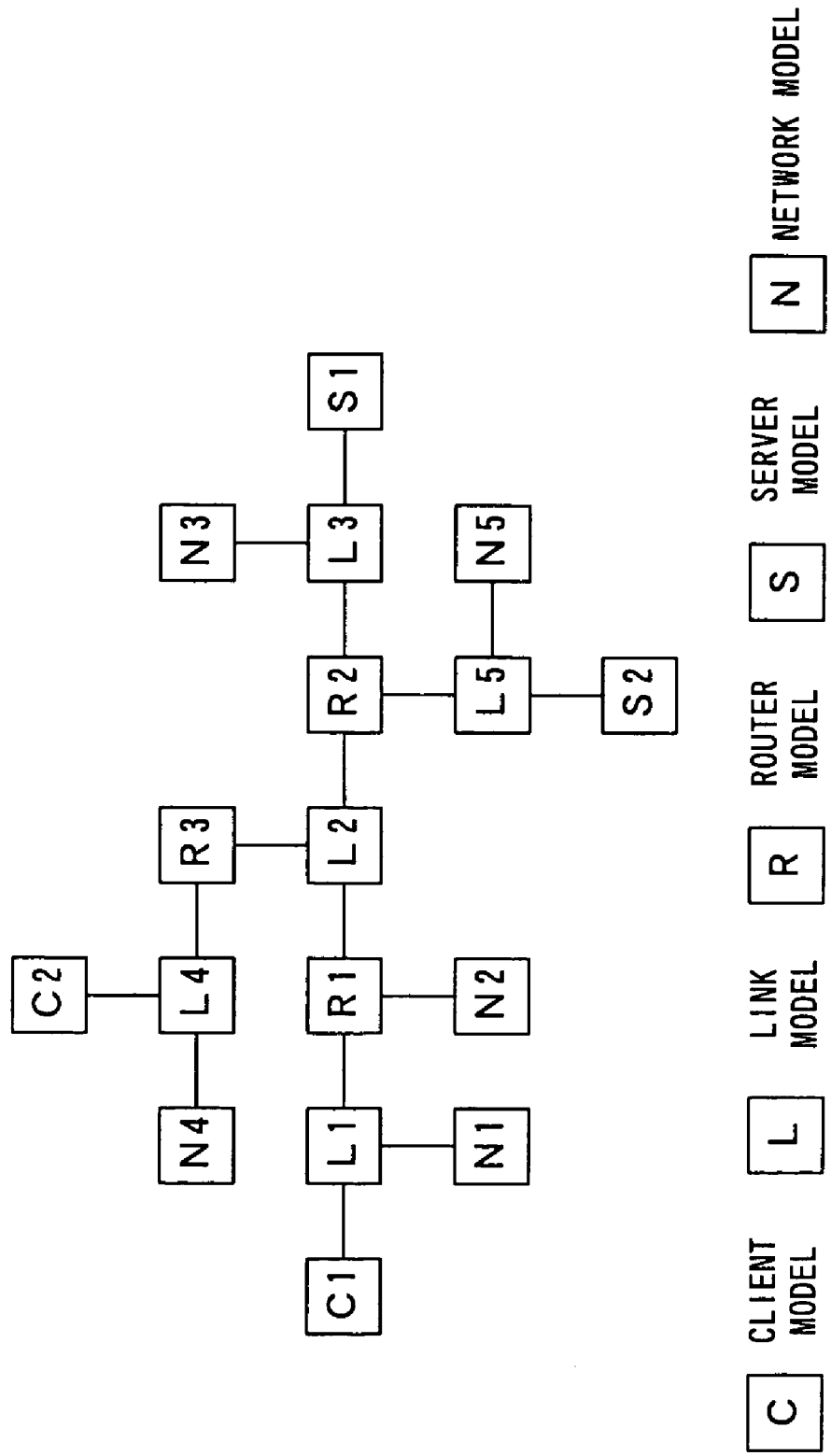
FIG. 4 shows the configuration of a simulation model.

FIG. 4 shows an example of the configuration of the simulation model.

In FIG. 4, each rectangle shows a model of an appliance. A model having the initial C is a client model, a model having the initial L is a link model, a model having the initial R is a router model, a model having the initial S is a server model, a model having the initial N is a network model. Each model shown in FIG. 4 is the model of the same appliance shown in FIG. 3.

According to the present embodiment, the concept of a network model is newly introduced to a simulation model. A network model Ni (i=1 through 4) is a model including a plurality of appliances (a client, a server, a link, etc.) outside the path connecting end points. That is, for example, a network model N2 is a model representing the entire segment of the Ethernet 2 connected to the router R1.

Since a group of appliances represented by the network model Ni is used only to apply a load to a path between appliances specified by the user using an end point list for the service between the appliances, it is not necessary to simulate the behavior of each appliance. That is, the group of appliances can be processed as components (models) for inputting/outputting virtual traffic in a path.

The path detection unit 13A can collect the appliance information from the existing network management tool.

The simulation model shown in FIG. 4 can be represented by software (program) in the data structure of a list, etc.

Upon receipt of the configuration information from the model configuration determination unit 11, the model setting unit 12 selects an appropriate model for each component of the simulation model, and requests the measurement unit of the measurement/information collection unit 13 corresponding to the model to obtain a measurement value required to set a parameter value of the selected model. That is, the model setting unit 12 requests the server measurement unit 13B of the measurement/information collection unit 13 to measure a server model, and requests the router measurement unit 13C to measure a router model.

The measurement/information collection unit 13 shown in FIG. 2 comprises the server measurement unit 13B and the router measurement unit 13C. However, the measurement unit is provided for each type of model requested by the model setting unit 12. Therefore, the measurement/information collection unit 13 can provide a measurement unit other than the above described units. The model setting unit 12 selects an appropriate measurement unit in the measurement/information collection unit 13 depending on the algorithm for obtaining parameter value from the measurement value, and requests the measurement unit to obtain a measurement value.

For example, if a server model is a Web server model, then the parameter is an average value and a variance value of the size of a page to be accessed, a service time per page byte, etc. The average value and the variance value of the page size can be obtained from, for example, the average value and the variance value of the size of an input/output packet, etc. which is the MIB2 information. In addition, the relationship between the page size and the service time can be obtained as the primary approximation of the service time of a server measured for a plurality of page sizes by, for example, accessing the Web server as a pseudo-client.

The model setting unit 12 requests the server measurement unit 13B to measure the service time of a specified page size, and requests the MIB2 information collection unit 13D to collect the MIB2 information. Then, a parameter value of a server model is determined from the measurement results and the MIB2 information received respectively from the server measurement unit 13B and the MIB2 information collection unit 13D.

In addition, assuming that parameter of a link model is the maximum band width, and that the parameter value is obtained from the interface speed corresponding to the router connected to a target link, the model setting unit 12 requests the MIB2 information collection unit 13D of the measurement/information collection unit 13 to collect the corresponding interface speed.

Furthermore, assuming that the parameter of a router model is the maximum throughput or the number of interfaces, and that the maximum throughput can be obtained from the response time of the router, and the number of interfaces can be obtained from the MIB2 information, the model setting unit 12 requests the router measurement unit 13C and the MIB2 information collection unit 13D of the measurement/information collection unit 13 respectively to measure the response time and collect the MIB2 information. Then, the model setting unit 12 determines the parameter value based on the requested values from the router measurement unit 13C and the MIB2 information collection unit 13D.

The router measurement unit 13C can also use the method of obtaining the difference in round-trip time (the time taken by a packet transmitted from a computer, reaching another computer, and returning with a reply) for each hop known as the Unix software 'pathchar' as router measurement. Furthermore, a round-trip time can be measured using a ping command according to an echo message of the ICMP (Internet control message protocol).

In addition, for a network model, the frequency of traffic input/output from a target path is to be obtained. For example, since the number of packets input to and output from the target path can be obtained according to the MIB2 information of the interface (the interface with the Ethernet 2) corresponding to the router (the router R1 shown in FIG. 3 in the case of the network model N2 shown in FIG. 4) positioned at the connection between a network model and a path, the frequency of the input/output traffic, and the average value and the variance value about the size can be obtained by collecting the number of packets, and computing the time change.

Any of the above described parameter values can be obtained by collecting target data from an existing network monitor (management), or by combining the collected data with a measurement result.

The MIB2 information collection unit 13D collects the MIB2 information from the network 20 by the SNMP, a CMIP (common management information protocol), etc.

The model setting unit 12 generates a simulation model based on the configuration information about a simulation model received from the model configuration determination unit 11, and the parameter value of each component (configuration model) of the simulation model obtained from the measurement result and the MIB2 information received from the measurement/information collection unit 13, and transmits the generated model to the simulator 14.

Then, the simulator 14 simulates the network 20 by simulating the simulation model received from the model setting unit 12.

When the measurement/information collection unit 13 fails in the requested measurement, or when it is impossible to carry out the measurement, the model setting unit 12 can be notified of the fact. In this case, the model setting unit 12 can newly request the measurement/information collection unit 13 to carry out the measurement for another model.

Before conducting the path search, the path detection unit 13A can ask the model setting unit 12 the necessity of the acquisition of the type information of a link. In this case, the path detection unit 13A does not detect the type of link if the model setting unit 12 can select a model regardless of the type of link.

In the case of the network 20 shown in FIG. 3, the path detection unit 13A can detect and search four paths C1-S1 (path 1-1), C1-S2 (path 1-2), C2-S1 (path 2-1), and C2-S2 (path 2-2), compares the simulation result with the actual value, and amend the parameter value. In this case, for example, if the service time value of a server is smaller than the actual value, then the parameter value of the model is amended such that the service time can be prolonged.

In addition, the model setting unit 12 can store the previous measurement value, and obtain the parameter value of the model using the stored value.

Figure 5:
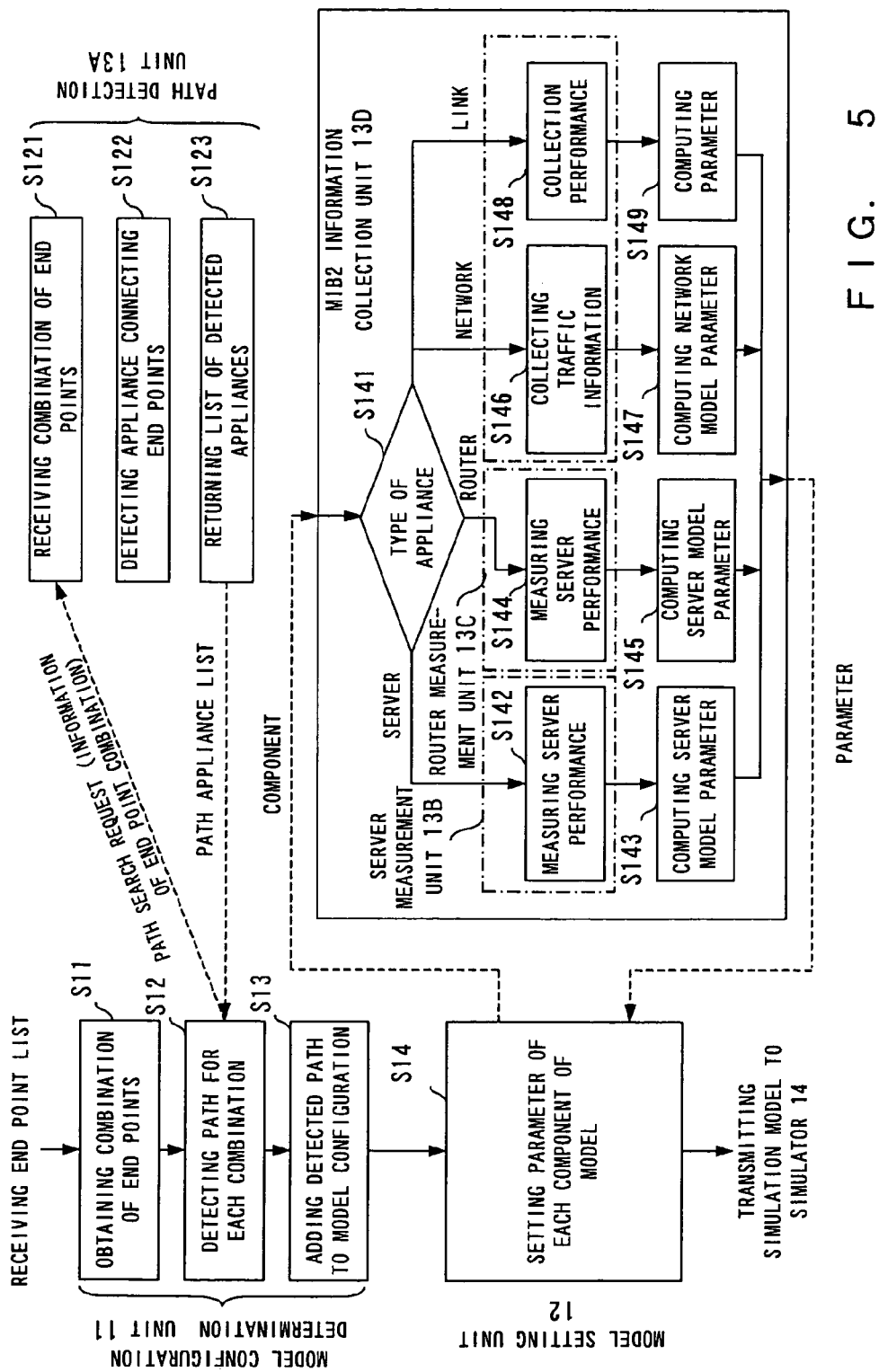
FIG. 5 shows the entire operation flow according to the first embodiment of the present invention.

The entire operation flow according to the first embodiment of the present invention is described by referring to FIG. 5.

First, upon receipt of the end point list input by the user, the model configuration determination unit 11 obtains a combination of end points (step S11). This process corresponds to the process of obtaining the combination of the clients C1 and C2 and the servers S1 and S2 in the example shown in FIG. 3.

Then, the model configuration determination unit 11 detects a path (communications path) for each of the combinations in the network (step S12).

The detection of a path in step S12 is started by specifying the information about the combinations of the end points, and requesting the path detection unit 13A to search a path connecting the end points.

Upon receipt of the information about the combination of the end points (step S121), the path detection unit 13A detects an appliance (and a link) in the path connecting the end points in the network using the 'traceroute', etc. (step S122).

Then, the path detection unit 13A generates a path appliance list indicating the connection configuration of the detected appliance (and the link), and returns the list to the model configuration determination unit 11 (step S123).

The model configuration determination unit 11 sequentially receives the path appliance lists of end points from the path detection unit 13A, generates the configuration of a simulation model based on the received lists, and transmits it to the model setting unit 12 (step S13). In this case, for example, the entire configuration of the final simulation model of the network 20 as shown in FIG. 4 is generated by sequentially adding the configurations obtained from the path appliance lists newly received from the path detection unit 13A to the configuration of the simulation model already generated based on the path appliance lists received from the path detection unit 13A.

The model setting unit 12 sets the value of the parameter of each component of a simulation model received from the model configuration determination unit 11 (step S14).

The process in step S14 is started by the model setting unit 12 requesting the measurement/information collection unit 13 to make necessary measurements and collect information to set the parameter of each component (a server model, a router model, a network model, and a link model) of a simulation model of the network 20.

Upon receipt of a request to make measurements and collect information about each of the components from the model setting unit 12, the measurement/information collection unit 13 determines the type of the component (step S141).

The measurement/information collection unit 13 instructs the server measurement unit 13B to measure the performance of the server if the type of component refers to a server. The server measurement unit 13B measures the performance of the specified server, and transmits the measurement result to the model setting unit 12 (step S142). The model setting unit 12 computes the parameter value of a server model based on the measurement result received from the server measurement unit 13B (step S143).

In addition, when the measurement/information collection unit 13 determines a 'router' in step S141, it instructs the router measurement unit 13C to measure the performance of the specified router. The router measurement unit 13C measures the performance of the specified router, and transmits the measurement result to the model setting unit 12 (step S144). The model setting unit 12 computes the parameter value of the router model based on the measurement result received from the router measurement unit 13C (step S145).

In addition, when the measurement/information collection unit 13 determines a 'network' in step S141, it instructs the MIB2 information collection unit 13D to collect the traffic information of the specified network. The MIB2 information collection unit 13D collects the traffic information about the specified network model, and transmits it to the model setting unit 12 (step S146). The model setting unit 12 computes the parameter value of the network model according to the traffic information received from the MIB2 information collection unit 13D (step S147).

If the measurement/information collection unit 13 determines a 'link' in step S141, it instructs the MIB2 information collection unit 13D to collect the performance information about the interface speed, etc. of the router connected to the specified link. The MIB2 information collection unit 13D collects the performance information about the specified link model, and transmits it to the model setting unit 12 (step S148). The model setting unit 12 computes the parameter value of the link model according to the performance information received from the MIB2 information collection unit 13D (step S149).

The model setting unit 12 obtains the value of a parameter of each component of a simulation model, generates a simulation model based on the parameter values and the configuration information about the simulation model received from the model configuration determination unit 11, and transmits the simulation model to the simulator 14 (step S14).

Figure 6:
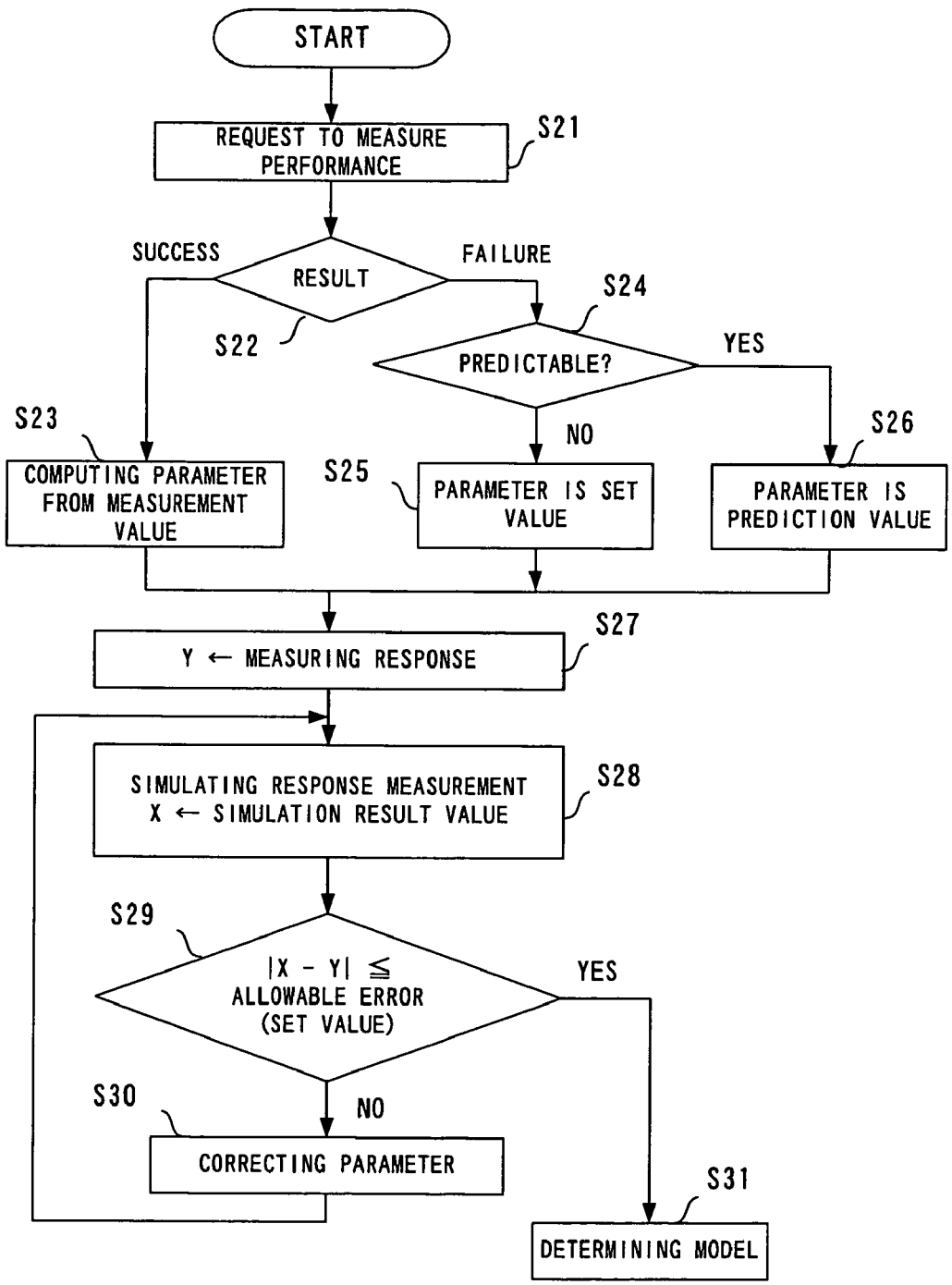
FIG. 6 is a flowchart showing the detailed operations of the model setting unit.

The process of the model setting unit 12 requesting the measurement of performance of a simulation model, and setting the parameter value of the component is described below in detail by referring to the flowchart shown in FIG. 6. FIG. 6 is a flowchart of the process of the model setting unit 12.

First, the model setting unit 12 requests the measurement/information collection unit 13 to measure the performance of each component of the simulation model received from the model configuration determination unit 11 (step S21).

Then, upon receipt of the requested result from the measurement/information collection unit 13, the model setting unit 12 determines whether or not the measurement/information collection unit 13 has succeeded in the measurement (step S22). If yes, it computes based on the measurement value received from the measurement/information collection unit 13 the parameter value of the component whose performance measurement has been requested in step S21 (step S23).

If it is determined in step S23 that the component is a router model, the internal delay time of the router is obtained from, for example, the minimum value of the difference in response time measured for each path hop, and the result is processed as the parameter value of the router model.

On the other hand, if it is determined in step S22 that the measurement/information collection unit 13 has failed in the measurement, it is determined whether or not the parameter value of the target component can be predicted from the measurement value of the component whose measurement has been successfully made (step S24). If it cannot be predicted (NO in step S24), then a predetermined set value is set as the parameter of the target component (step S25).

On the other hand, if it is determined that the value van be predicted (YES in step S24), then the predicted value is set as the parameter of the target component (step S26).

If the component is a server model, for example, the interface speed of the router in the same segment is regarded as the communications speed of the network card in the process in step S26. If the component is the router model of the router of the hop i, the throughput of the router of the hop i is uncertain, and the throughput of the hop (i−1) is certain, then the throughput of the router of the hop i is computed from the measurement value of the response containing the router of the hop i and the router of the hop (i−1), and the throughput value of the router of the hop (i−1). In addition, if there is an appliance of the same type which has already succeeded in performance measurement, then the measurement of the appliance is processed as a prediction value.

After the parameter value of the component is set in step S23, S25, or S26 as described above, a test process of the parameter value of the model is performed in the process in or after step S27.

First, the measurement/information collection unit 13 is requested to measure the response time for the path containing the appliance corresponding to the model to be tested, and the response time is set to a variable Y (step S27).

Then, an operation equivalent to the process in step S27 is performed on the simulation model, and the result value of the simulation is set to a variable X (step S28).

For example, when a 'ping' is issued to a router in the response measurement in step S27, the issue of the 'ping' to the component (router model) corresponding to the router is simulated in the simulation model in step S28.

Then, it is determined in step S29 whether or not the difference between the variable X and the variable Y is within a predetermined allowable error. If it is within the predetermined allowable error (YES in step S29), then the parameter value of the tested model is determined (step S31).

If it is not within the allowable error (NO in step S29), then the parameter value of the tested model is amended (step S30), and control is returned to step S28.

Thus, the processes in steps 28 through S30 are repeated until it is determined in step S29 that the difference is within the allowable error, and the parameter value of the tested model is amended. Then, the parameter value within the allowable error is processed as a determined value (step S31).

If the measurement value of a response (response measurement time) is smaller than an actual measurement value (actual time) in step S30, the parameter value (time) of the model having the lowest reliability is amended to be larger (delayed).

In this case, assume that the reliability of the parameter value set in step S25 is the lowest, and reliability of the measurement value set in step S23 is the highest. Then, the reliability of the prediction value set in step S26 is a mean value between them.

In addition, the smaller the unevenness of the measurement values is, or the larger the number of samples is, the higher the reliability becomes. Furthermore, the shorter the distance of the network to be measured is, the higher the reliability becomes. Otherwise, the reliability can be set based on the reliability of the measurement unit of the measurement/information collection unit 13, based on the precision of the model of a component, etc.

As described above, according to the first embodiment of the present invention, since a simulation model is generated by configuring the simulation model of the network 20 to be simulated by inputting an end point list, and setting the parameter value of each component according to the actual measurement value obtained from the network 20 and the MIB2 information, the work load of the user can be reduced. In addition, since the database of the simulation model of an appliance is not used in generating a simulation model, the scale of a hardware configuration can be reduced, and the system can flexibly correspond to a change in network configuration.

Furthermore, since the measurement and the collection can be carried out on the information not obtained from a conventional network management tool, a precise simulation model can be generated. In addition, since the parameter value of each component of a simulation model is obtained from the measurement value obtained from the network 20 being operated or obtained according to the MIB2 information, the simulation model precisely reflecting the actual network 20 can be generated.

Described below is the second embodiment of the present invention. The second embodiment is obtained by distributing the measurement/information collection unit 13 inside and outside the network, or by mounting it in the node such as a server, a router, etc. in the network so that the precision of the necessary measurement value for obtaining the parameter value of each component of a simulation model can be improved, and the types of data to be measured can be increased. Thus, by improving the precision of a measurement value and increasing the types of measurement data, the parameter value of a simulation model in a network can be more correctly set.

FIG. 7 is a block diagram showing the system configuration according to the second embodiment of the present invention.

The topology of the network system shown in FIG. 7 is star-shaped, and centers a network E. Networks A, B, C, and D are connected to the network E.

Measurement devices 31A, 31B, 31C, and 31D are connected respectively to the networks A, B, C, and D. These measurement devices 31A, 31B, 31C, and 31D correspond to the measurement/information collection unit 13 according to the first embodiment. A model generation device 33 provided in the network E corresponds to the model configuration determination unit 11 and the model setting unit 12 according to the first embodiment. A simulator 34 corresponds to the simulator 14 according to the first embodiment.

The measurement devices 31A, 31B, 31C, and 31D obtain the measurement information about a server, a router, etc. provided in the networks A, B, C, and D, and the MIB2 information. That is, the model generation device 33 provided in the network E obtains the necessary measurement information for setting the parameter values of a server model, a router model, a network model, and a link model, and collecting the MIB2 information. In addition, it generates a path appliance list at a request from the model generation device 33.

The model generation device 33 instructs the measurement devices 31A, 31B, 31C, and 31D to search a path and make measurements (including a request to collect the MIB2 information). Upon receipt of the request and the instruction, the measurement devices 31A, 31B, 31C, and 31D generate a requested path appliance list, make specified measurements, and collect the requested MIB2 information. They return the request results and the measurement results to the model generation device 33.

The measurement devices 31A, 31B, 31C, and 31D can also be incorporated as agents into a server, a router, or a network management tool.

Thus, according to the second embodiment, since the measurement devices 31A, 31B, 31C, and 31D are mounted in places where measurements can be easily made, more precise measurement values can be obtained than in the first embodiment of the present invention. For example, when a measurement unit is provided in a server, the influence of a path can be more effectively removed from the measurement value of the server than in the case where the measurement unit is provided outside the server. Furthermore, the information hardly obtained from outside the server such as the memory configuration of the server, etc. can be obtained. Therefore, according to the second embodiment, the precision of a model of each component of a simulation model can be improved.

Described below is the third embodiment of the present invention.

Figure 8:
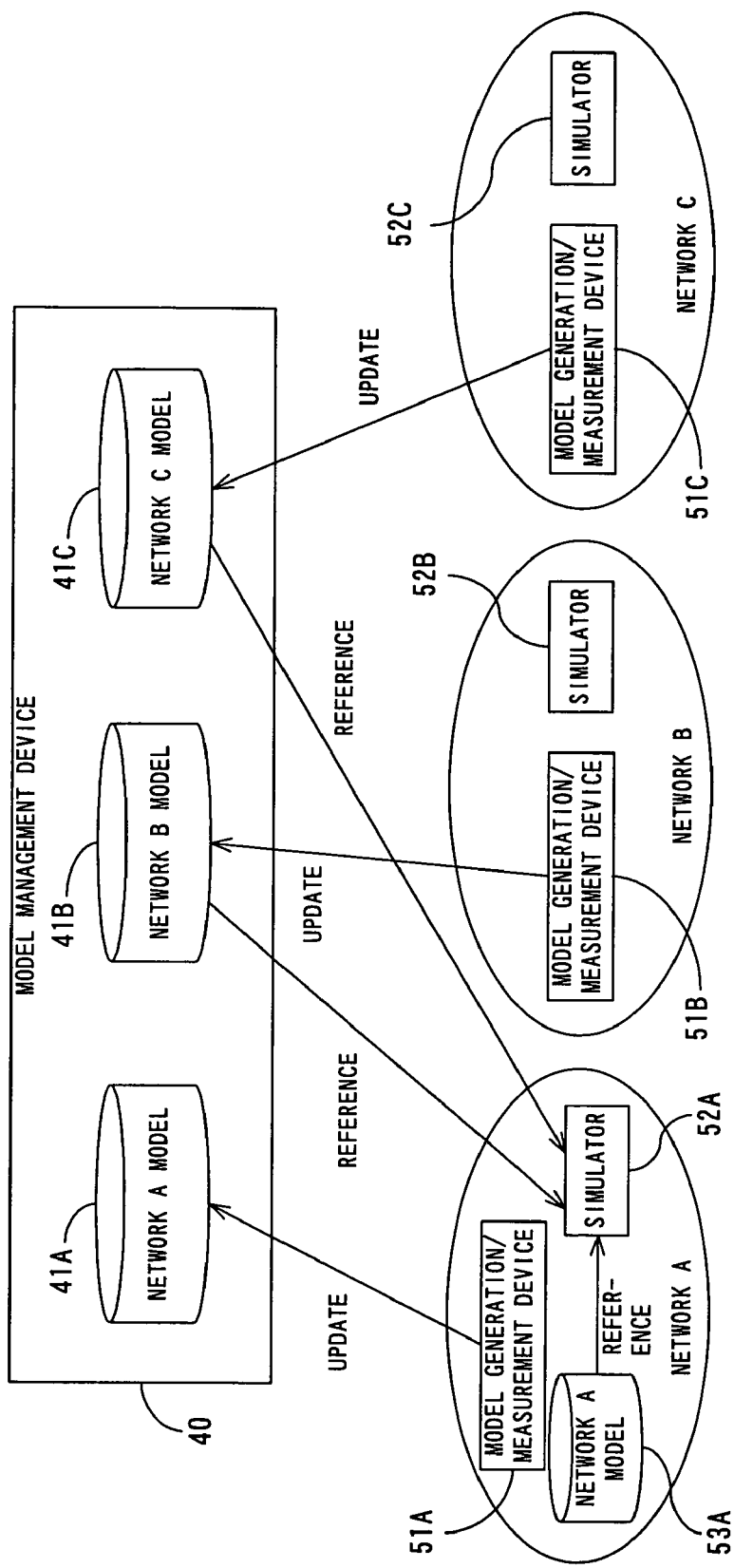
FIG. 8 shows the system configuration according to the third embodiment of the present invention.

FIG. 8 is a block diagram showing the system configuration according to the third embodiment of the present invention. In FIG. 8, the network is managed after being divided into three lower networks (subnetworks) A, B, and C. In the example shown in FIG. 8, the network is managed after being divided into three lower networks, but it is obvious that the network can be divided into four or more lower networks according to the present invention.

A model management device 40 collectively manages simulation models 41A, 41B, and 41C of the three networks A, B, and C.

A manager is assigned to each of the networks A, B, and C to manage the operation of each of the networks. Each manager manages and operates the corresponding network depending on the conditions of the network.

The networks A, B, and C comprise model generation/measurement devices 51 (51A, 51B, and 51C) and simulators 52 (52A, 52B, and 52C). The model generation/measurement device 51 comprises the model configuration determination unit 11, the model setting unit 12, and the measurement/information collection unit 13 of the first embodiment. The simulator 52 corresponds to the simulator 14 of the first embodiment. The networks A, B, and C comprise simulation models (network A model 53A, network B model, and network C model) of respective networks.

The model generation/measurement device 51 of each of the networks A, B, and C generates a simulation model of each network (network A model, network B model, and network C model), and provides the generated model for the model management device 40.

The timing of providing a network model can be fixed, periodic, or a specific time when a simulation model is updated, etc.

The manager of each of the networks A, B, and C can refer to or download a simulation model of another network from the model management device 40 through a communications unit, etc. not shown in the attached drawings. Thus, the manager of each network can refer to the simulation model of another necessary network from the model management device 40 when a service covering another network is evaluated, and can simulate the evaluation by the simulator 52 of the current network. In addition, the simulation model of the entire network containing the networks A, B, and C can be simulated by the simulator 52 in the current network by referring to the simulation models of the other lower networks from the model management device 40.

FIG. 8 shows an example of the configuration for the manager of the network A referring to the simulation models (network B model and network C model) of the networks B and C from the model management device 40, generating a simulation model of the entire network comprising the networks A, B, and C, and simulating it using the simulator 52A. In this case, the simulator 52A refers to the network A model 53A in the current network A for a simulation model of the current network A.

Other managers of the networks B and C similarly refer to the simulation models of another network from the model management device 40, and execute simulation coveting another network or of the entire network using the simulators 52B and 52C in the current network. In this case, the manager of each network refers only to the simulation model of another necessary network for the simulation, and executes the simulation using the simulator 52 in the current network.

The model management device 40 can be set in any network. For example, in the example shown in FIG. 8, it can be set independently at a place other than the networks A, B, and C. In addition, the simulator 52 of each of the networks A, B, and C refers to a simulation model of the lower network managed by the model management device 40.

With the configuration according to the third embodiment of the present invention, the manager of each network can control the information publication level of the current network by adjusting the detail level of the simulation model of the current network provided for the model management device 40. The detail level of the simulation model of another network which can be referred to can be appropriately adjusted depending on the detail level of the simulation model published (provided for the model management device 40) by the network to be referred to. For example, a network whose simulation model is not provided for the model management device 40 is designed not to refer to the simulation model of another network. Otherwise, for example, a network whose simulation model is provided for the model management device 40 at the detail level of an appliance unit can be allowed to be referred to up to the detail level in appliance unit for the simulation model of another network.

The restriction of reference can be set such that, for example, the model management device 40 can be automatically controlled.

Thus, according to the third embodiment of the present invention, for a large scale network which can be divided into a plurality of lower network, a simulation model of each lower network is collectively managed by the model management device 40, and each lower network provides the model management device 40 with a simulation model depending on the situation of each lower network.

Thus, according to the third embodiment of the present invention, the model management device 40 constantly maintains the simulation model of each lower network in the state in which the situation of the network is reflected. In addition, the simulator 52 of each lower network can refer to the simulation model of another lower network depending on the publication level of the simulation model provided by the current network. In addition, the manager of each lower network can determine the detail level of the simulation model of the current network provided for the model management device 40. That is, the information publication level of a simulation model can be adjusted in lower network units.

According to the third embodiment of the present invention, each lower network stores the simulation model of the current network. However, the model management device 40 can collectively manage the simulation models of all lower network, and each lower network can be designed not to store a simulation model of the current network. With the configuration, the entire system reduces the total cost of the storage device. In addition, since the latest simulation model of the lower network is immediately provided and stored, the simulator of each lower network constantly refers to a simulator model of each of the latest lower networks for simulation.

Figure 9:
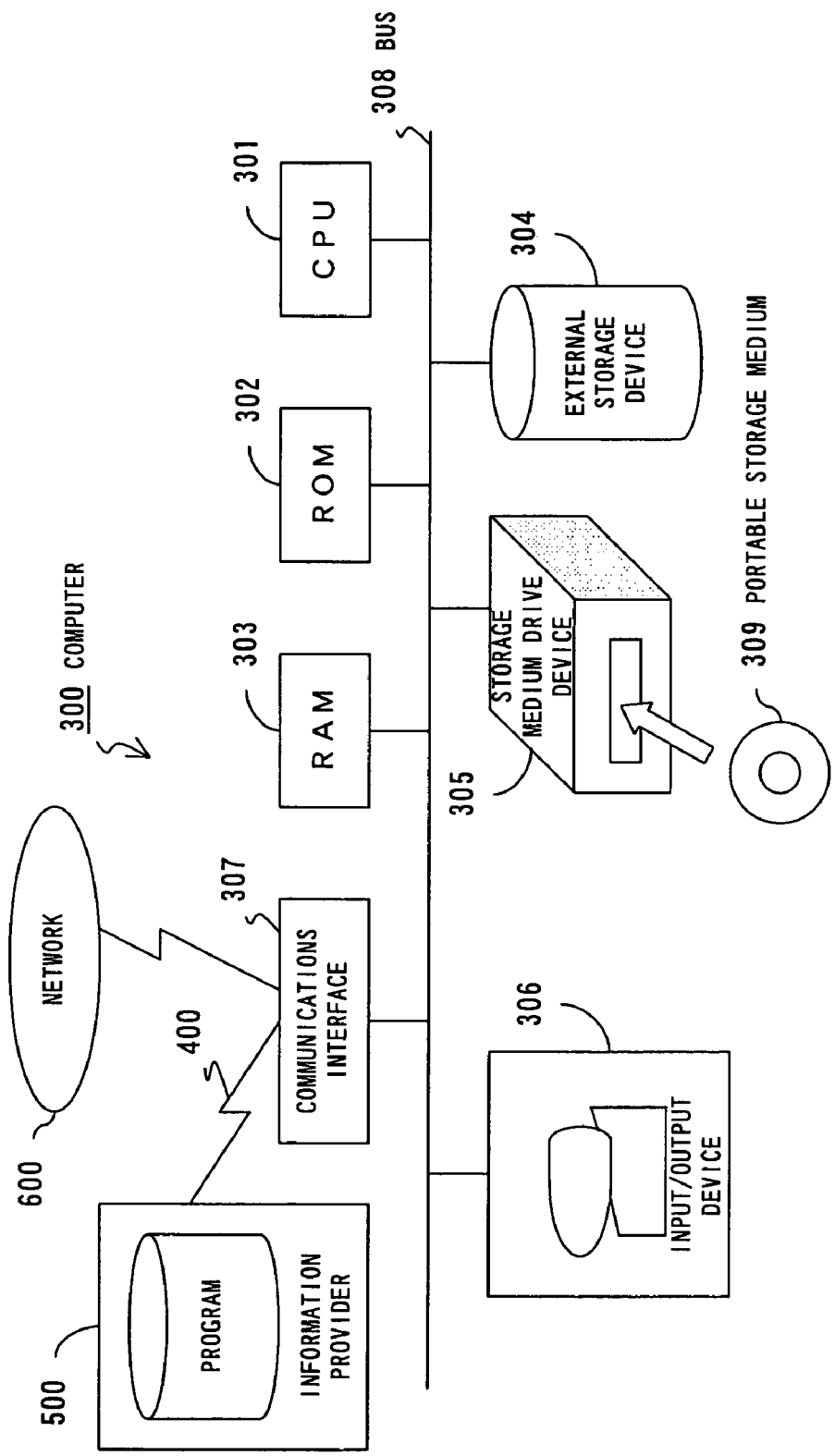
FIG. 9 is a block diagram of the hardware configuration of the computer realizing each embodiment of the present invention.

FIG. 9 is a block diagram of the hardware configuration of the computer for realizing the simulation model generation apparatus of the network according to each embodiment of the present invention.

In FIG. 9, a computer 300 comprises a CPU 301, ROM 302 connected to the ROM 302 through a portable storage medium 309, RAM 303, an external storage device 304, a storage medium drive device 305, an input/output device 306, and a communications interface 307. The program for realizing the process of the simulation model generation apparatus according to the present embodiment is stored in a portable storage medium 309. The program stored in the portable storage medium 309 installed in the external storage device 304 or the storage medium drive device 305 is loaded onto the RAM 303, and executed by the CPU 301. In the execution, for example, the function of the OS, etc. stored in the ROM 302 is used.

The communications interface 307 communicates data, message, etc. with an information provider 500 through a communications line 400, and downloads the program stored in the information provider 500 onto the RAM 303 or external storage device 304. Thus, the downloaded program is executed by the CPU 301, and realizes the function of the simulation model generation apparatus according to the present embodiment. In addition, the program for realizing the function of the simulation model generation apparatus according to the present embodiment can be remotely executed by the computer of the information provider 500 to receive only the generated simulation model.

Furthermore, the communications interface 307 accesses a network 600 to be simulated, and obtains the measurement value and the MIB2 information required to obtain a parameter value of each component of the simulation model of the network 600. The obtained data is referred to by the program executed by the CPU 301, and the CPU 301 computes the parameter value of each of the components.

The input/output device 306 comprises a display such as a CTR, an LCD, a PDP, etc., a pointing device such as a keyboard, a mouse, etc., and a voice input device, etc. It is used as an input device by a user inputting an end point list to the simulation model generation apparatus according to the present embodiment. In addition, the input/output device 306 is also used to output a simulation model generated by the simulation model generation apparatus according to the present embodiment.

Furthermore, when the input/output device 306 is applied according to the third embodiment, the input/output device 306 provides a user interface for the manager of the lower network (subnetwork) issuing an instruction to provide the model management device 40 with a simulation model generated by the model generation/measurement device 51 of the current network, or setting periodic provision of the simulation model. In addition, it provides the user interface for the manager adjusting the detail level of the simulation model of the current network to be provided for the model management device 40.

The portable storage medium 309 can be a floppy disk, CDs of various standards, DVDs of various standards, a PC card, etc. The external storage device 304 can be a hard disk device, a magneto-optical storage device, etc., and stores the configuration information of the simulation model, a generated simulation model, etc.

The communications line 400 is a wired or wireless line. The network 600 can be any of various types such as a LAN, a MAN, a WAN, Internet, Intranet, Extranet, etc.

As described above, a simulation model can be automatically generated for all networks according to the present invention. In addition, a simulation model correctly reflecting the situation of the network can be generated.

Furthermore, the computation cost of the simulation can be reduced without lowering the simulation precision by replacing all appliances outside the path connecting end points.

Furthermore, by distributing a unit for making measurements or collecting information required to generate a simulation model inside or outside a network and in a node in the network, the precision of a measurement value and the types of data can be increased, thereby more correctly setting the parameter value of a model of a component of a simulation model.

Additionally, by providing a unit for managing simulation models of a plurality of lower networks, and for receiving a simulation model of each lower network from the model generation apparatus mounted in each lower network, the simulator of each lower network can refer to the simulation model of a necessary lower network from the managing unit, thereby allowing a simulator in each lower network to execute a simulation over a network or a plurality of lower networks.

Depending on the detail level of a simulation model provided for the managing unit, each lower network can control the detail level of the simulation model of another lower network which can be referred to. Furthermore, the information publication level of the simulation model can be adjusted in a lower network unit.

What is claimed is:

1. A network simulation model generation apparatus, comprising:

a model configuration determination unit determining a configuration of a simulation model of a network by inputting information about at least two end points in the network, and inputting information about an appliance in a path in the network connecting the end points;

a model setting unit generating a simulation model of the network by selecting an appropriate model for each component of the simulation model determined by said model configuration determination unit, and inputting necessary data for setting a parameter value of each model;

a path detection unit detecting an appliance in a path of the network connecting the end points upon receipt of a request from said model configuration determination unit, and returning appliance information to said model configuration determination unit; and a measurement/information collection unit obtaining information for acquisition of requested data from the network upon receipt of a request from said model setting unit, obtaining the requested data according to the obtained information, and returning it to said model setting unit, wherein when said requested data of a model can not be measured, said model setting unit replaces the model with another model which does not require said requested data, and requests the measurement/information collection unit to obtain measured data for the other model, and said model setting unit determines whether the parameter value of the model can be predicted using the measured data of the other model, and when predictable, the predicted value is set as the parameter value of the model, and when it is not predictable, a predetermined set value is set as the parameter value of the model, and when the parameter value of the model is set, the measurement/information collection unit conducts a test of the parameter value of the model to determine a reliability of the parameter value of the model.

2. The apparatus according to claim 1, wherein
said model setting unit sets a single simple model for each connection point of the path for a component of a network outside the path connecting end points.

3. The apparatus according to claim 2, wherein
said model setting unit generates the single simple model as a model simulating input/output traffic for the connection points of the path.

4. The apparatus according to claim 1, wherein
when said model setting unit receives the notification from said measurement/information collection unit, said model setting unit changes the model into a simple model, and requests said measurement/information collection unit to obtain necessary data for setting a parameter value of the simple model.

5. The apparatus according to claim 1, wherein
said model setting unit requests said measurement/information collection unit to measure a model whose parameter value has been determined, simulates an operation equivalent to the measurement in a simulation model, and changes the parameter value of the model, if necessary, based on a comparison result between an actual measurement value obtained by said measurement/information collection unit and the simulation result.

6. The apparatus according to claim 5, wherein
said model setting unit changes the parameter value such that a difference between the actual measurement value and the simulation result can be within an allowable error.

7. The apparatus according to claim 1, wherein
said measurement/information collection unit is located both inside and outside of the network.

8. The apparatus according to claim 1, wherein
said measurement/information collection unit is mounted in a node in the network.

9. The apparatus according to claim 1, wherein
said network is divided into a plurality of subnetworks;
a model generation apparatus comprising said model configuration determination unit, model setting unit, path detection unit, and measurement/information collection unit, and generating a simulation model of a current network is mounted in each subnetwork; and
a model management unit managing a simulation model of each subnetwork provided from said model generation apparatus is mounted in each subnetwork.

10. The apparatus according to claim 9, wherein
a simulation model of each subnetwork managed by said model management unit can be referred to by a simulator provided in each subnetwork.

11. The apparatus according to claim 10, wherein
a manager of each subnetwork adjusts a detail level of a simulation model of a current network provided for said model management unit.

12. The apparatus according to claim 10, wherein
said model management unit adjusts and controls a simulation model of another subnetwork which can be referred to by a simulator of each subnetwork depending on a detail level of a simulation model provided by a model generation apparatus of each subnetwork.

13. The apparatus according to claim 9, wherein
said model generation apparatus of each subnetwork provides a simulation model of a current network for said model management unit when a preliminarily specified event occurs.

14. A method of generating a simulation model of a network, comprising:
(a) inputting information about at least two end points in a network, and inputting information about an appliance in a path in the network connecting the end points;
(b) detecting an appliance in a path in the network connecting the end points, and obtaining appliance information;
(c) determining a configuration of a simulation model of the network from the appliance information;
(d) selecting an appropriate model for each component of the determined simulation model;

(e) generating a simulation model of the network by requesting and obtaining necessary data for setting a parameter value of the selected model from the network, wherein
when said requested data of a model can not be measured, replacing the model with another model which does not require said requested data, requesting measured data for the other model, and determining whether the parameter value of the selected model can be predicted using the measured data of the other model,
when predictable, setting the predicted value as the parameter value of the selected model, and
when it is not predictable, setting a predetermined set value as the parameter value of the selected model, and conducting a test of the parameter value of the selected model to determine a reliability of the parameter value of the selected model.

15. The method according to claim 14, wherein
in (d) above, a single simple model is set for each connection point of the path for a component of a network outside a path connecting end points.

16. The method according to claim 15, wherein
in (d) above, the single simple model is generated as a model simulating input/output traffic for the connection points of the path.

17. The method according to claim 14, wherein
in (e) above, when the data cannot be obtained from the network, the model is changed into a simple model, and a new trial is to be made to obtain the necessary data for setting the parameter value of the simple model.

18. The method according to claim 14, wherein
(f) data about a model whose parameter value has been determined is actually measured in the network, and an operation equivalent to an actual measurement is simulated in the simulation model, and the parameter value of the model is changed, if necessary, based on a comparison result between the actual measurement value and the simulation result.

19. The method according to claim 18, wherein
in (f) above, the parameter value is changed such that a difference between the actual measurement value and the simulation result can be within an allowable error.

20. The method according to claim 14, wherein
data in (e) above is obtained at points located both inside and outside of the network.

21. The method according to claim 14, wherein
data in (e) above is obtained in a node provided in the network.

22. A method of generating a simulation model of a network, comprising:
(a) dividing the network into a plurality of subnetworks;
(b1) inputting information about at least two end points in a network, and inputting information about an appliance in a path in the network connecting the end points;
(b2) detecting an appliance in a path in the network connecting the end points, and obtaining appliance information;
(b3) determining a configuration of a simulation model of the network from the appliance information;
(b4) selecting an appropriate model for each component of the determined simulation model;
(b5) generating a simulation model of the network by requesting and obtaining necessary data for setting a parameter value of the selected model from the network; and
(c) managing a simulation model, generated in each subnetwork; wherein when said requested data of a model which can not be measured, replacing the model with another model which does not require said requested data, requesting measured data for the other model, and determining whether the parameter value of the selected model can be predicted using the measured data of the other model, when predictable, setting the predicted value as the parameter value of the selected model, and when it is not predictable, setting a predetermined set value as the parameter value of the selected model, and conducting a test of the parameter value of the selected model to determine a reliability of the parameter value of the selected model.

23. The method according to claim 22, wherein a simulation model of each of the managed subnetworks can be referred to by a simulator provided in each subnetwork.

24. The method according to claim 23, wherein a detail level of a simulation model of each of the subnetworks is adjusted by a manager of each subnetwork.

25. The method according to claim 23, wherein a detail level of a simulation model of another subnetwork which can be referred to by a simulator of each subnetwork can be adjusted and controlled depending on a detail level of a simulation model provided by a model generation apparatus of each subnetwork.

26. A computer program product embodied on a computer-readable medium and comprising code that, when executed causes a computer to perform the following:

(a) inputting information about at least two end points in a network, and inputting information about an appliance in a path in the network connecting the end points;

(b) detecting an appliance in a path in the network connecting the end points, and obtaining appliance information;

(c) determining a configuration of a simulation model of the network from the appliance information;

(d) selecting an appropriate model for each component of the determined simulation model;

(e) generating a simulation model of the network by requesting and obtaining necessary data for setting a parameter value of the selected model from the network, wherein when said requested data of a model can not be measured, replacing the model with another model which does not require said requested data, requesting measured data for the other model, and determining whether the parameter value of the selected model can be predicted using the measured data of the other model, when predictable, setting the predicted value as the parameter value of the selected model, and when it is not predictable, setting a predetermined set value as the parameter value of the selected model, and conducting a test of the parameter value of the selected model to determine a reliability of the parameter value of the selected model.

27. The computer program product according to claim 26, wherein said program directs the computer to perform a process such that, in (d) above, a single simple model is set for each connection point of the path for a component of a network outside a path connecting end points.

28. The computer program product according to claim 27, wherein said program directs the computer to perform a process such that, in (d) above, the single simple model is generated as a model simulating input/output traffic for the connection points of the path.

29. The computer program product according to claim 26, wherein said program directs the computer to perform a process such that, in (e) above, when the data cannot be obtained from the network, the model is changed into a simpler model, and a new trial is to be made to obtain necessary data for setting a parameter value of the simple model.

30. The computer program product according to claim 26, wherein said program directs the computer to further perform a process such that (f) data about a model whose parameter value has been determined is actually measured in the network, and an operation equivalent to the actual measurement is simulated in a simulation model, and the parameter value of the model is changed, if necessary, based on a comparison result between an actual measurement value and the simulation result.

31. The computer program product according to claim 30, wherein in (f) above, the parameter value is changed such that a difference between the actual measurement value and the simulation result can be within an allowable error.

32. The computer program product according to claim 26, wherein said program directs the computer to perform a process such that, data in (e) above is obtained at distributed points inside and outside the network.

33. The computer program product according to claim 26, wherein said program directs the computer to perform a process such that, data in (e) above is obtained in a node provided in the network.

34. A computer program product embodied on a computer-readable medium and comprising code that, when executed, causes a computer to perform the following:

(a) dividing the network into a plurality of subnetworks;

(b1) inputting information about at least two end points in a network, and inputting information about an appliance in a path in the network connecting the end points;

(b2) detecting an appliance in a path in the network connecting the end points, and obtaining appliance information;

(b3) determining a configuration of a simulation model of the network from the appliance information;

(b4) selecting an appropriate model for each component of the determined simulation model;

(b5) generating a simulation model of the network by requesting and obtaining necessary data for setting a parameter value of the selected model from the network; and (c) managing a simulation model, generated in each subnetwork, wherein when said requested data of a model can not be measured, replacing the model with another model which does not require said requested data, requesting measured data for the other model, and determining whether the parameter value of the selected model can be predicted using the measured data of the other model, when predictable, setting the predicted value as the parameter value of the selected model, and when it is not predictable, setting a predetermined set value as the parameter value of the selected model, and conducting a test of the parameter value of the selected model to determine a reliability of the parameter value of the selected model.

35. The computer program product according to claim 34, wherein
said program directs the computer to perform a process such that, a simulation model of each of the managed subnetworks can be referred to by a simulator provided in each subnetwork.

36. The computer program product according to claim 35, wherein
said program directs the computer to perform a process such that a detail level of a simulation model of another subnetwork which can be referred to by a simulator of each subnetwork can be adjusted and controlled depending on a detail level of a simulation model provided by a model generation apparatus of each subnetwork.

37. The computer program product according to claim 34, wherein
said program directs the computer to perform a process such that, a detail level of a simulation model of each of the subnetworks is adjusted by a manager of each subnetwork.

38. A network simulation method, comprising:
determining a configuration of a simulation model of a network by inputting information about end points in a network and appliance information about an appliance in a path in the network connecting the end points;
generating the simulation model by selecting an appropriate model for each component of the simulation model based on the configuration; and
measuring performance of the simulation model, using a predetermined value as a parameter of any component for which neither a measurement nor a predicted value is obtainable.

* * * * *